May 31, 1966  A. J. PETROS ETAL  3,253,492
SHEARING APPARATUS

Filed Nov. 6, 1963  3 Sheets-Sheet 3

INVENTORS
ANDREW J. PETROS &
ROBERT L. DAWSON

United States Patent Office 3,253,492
Patented May 31, 1966

3,253,492
SHEARING APPARATUS
Andrew J. Petros, Oakdale, and Robert L. Dawson, Pittsburgh, Pa., assignors to Mesta Machine Company, a corporation of Pennsylvania
Filed Nov. 6, 1963, Ser. No. 321,832
6 Claims. (Cl. 83—557)

This invention relates to shearing apparatus and more particularly to apparatus for crop shearing strip material and the like.

In the operation of a strip mill, it is necessary at certain points to remove the front and rear ends of the rolled pieces so the remaining pieces meet chemical and metallurgical specifications and are delivered in desired lengths and shapes. In such shearing operations, upcut shears are commonly employed. Two major problems have existed in the use of such shears. When the upper knife of the shears was permanently stationed above the path of material travel a distance sufficient to assure clearance for the material to pass through the shears, an extreme amount of power was required to throw the lower knife up to the upper knife, since the lower knife also was required to lift the material to be sheared to the upper knife. One popular method of reducing this required power involved the construction of the shears with the upper knife stationed close to the path of material travel, thereby minimizing the necessary crank throw for moving the lower blade to the upper blade. However, with the upper knife stationed close to the path of material travel when inoperative, less than careful feeding of material through the shears often resulted in damage to the shears and damage to the material, since upwardly-unrestricted strip material traveling at high speed bobs and jumps up from its supporting table. Attempts have been made to eliminate these problems but in every case heretofore the proposed device has failed to do so without introducing disadvantages of complexity of design and construction, high maintenance costs and loss of operating efficiency. The shearing apparatus of this invention eliminates the noted problems and the disadvantages of the prior devices. The apparatus of this invention is time saving, simple in design and construction and requires a comparatively small amount of power for operation while still assuring clearance for pasage of the material through the shears. In this invention, the upper knife of the shears operates mechanically independently of the lower knife and, thus, may be automatically positioned and maintained in close proximity above the path of material travel during the shearing operation to reduce the power requirement for the throw of the lower knife and then may be automatically retracted and maintained during inoperativeness in a position remote from the path to assure clearance for the material moving through the shears. The apparatus can be used for shearing various materials of numerous shapes. The apparatus shall, however, be specifically described in this application in connection with crop shearing of metal strip.

Preferably there is provided operable means for feeding strip material along a path, a rigid frame surrounding the path of strip travel, a lower knife supported in the frame transversely beneath the path of strip travel, the lower knife being movable upwardly across the path of strip travel, means responsive to a signal operable to move the lower knife across the path of material travel, an upper knife supported in the frame transversely above the path of strip travel, the upper knife being movable into an operative position proximate to the path of strip travel and retractable therefrom into an inoperative position remote from the path of strip travel, means on the frame operable selectively to move the upper knife from the retracted position to the operative position and from the operative position to the retracted position, said means being operable to maintain the upper knife in the operative position during the shearing operation and to maintain the upper knife in the retracted position during inoperativeness and signal means activating the means moving the upper knife as work approaches and leaves the shear.

The upper knife of this invention is preferably vertically-movably mounted in side guides and is supported primarily by a pair of coil springs which bias the upper knife to its inoperative position removed from the path of strip travel. The upper knife also is suspended from the top of the rigid frame by a pair of pivotally attached, preferably single arm, toggle linkages which are also pivotally connected to a laterally-reciprocable rod, the movement of which is caused preferably by a pneumatic or hydraulic cylinder. The upper knife is moved downwardly to its position proximate to the path of strip travel at the outset of a shearing operation by actuation of the pneumatic cylinder. When the upper knife reaches its full down position, each linkage forms a straight line and the maintenance of the linkages in that position by the rod which is held in position by the pressure of the cylinder resists the upper knife's urge to move upwardly during the actual shearing operation. When the shearing has been completed, the cylinder immediately reverses its stroke, relieving the pressure on the rod and, in turn, the linkages and causing the links to angle to each other, thus urging the upper knife to rise. The coil springs under the outer ends of the upper knife, being depressed throughout the shearing operation, upon being relieved, cause the upper knife to rise to and remain in its inoperative position away from the path of strip travel.

Other features, objects and advantages of this invention will be apparent from a consideration of the following description and the accompanying drawings in which.

Figure 1:
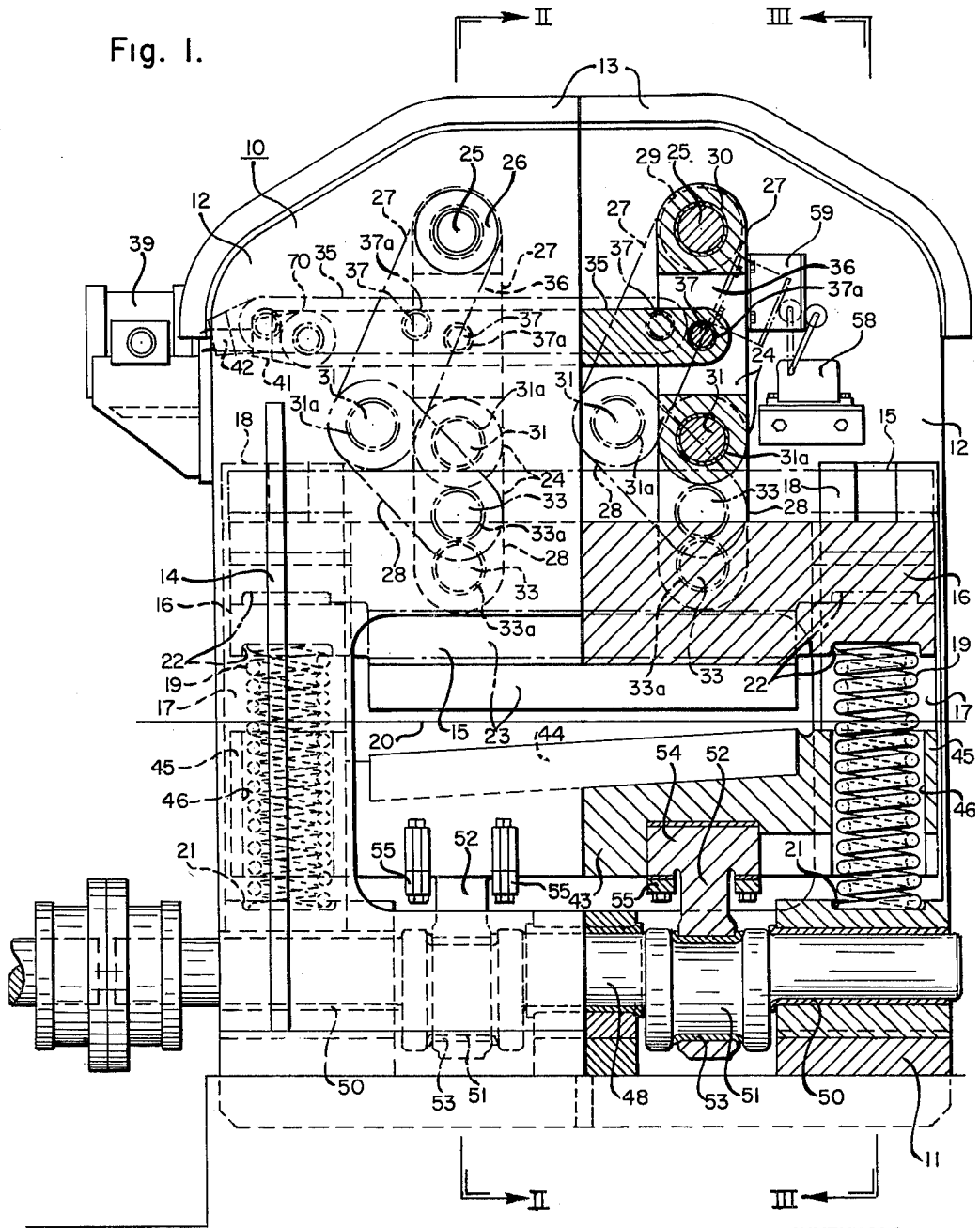
FIGURE 1 is a side view, partly in section of shearing apparatus according to this invention with parts shown in one position in solid lines and in another position in dotted lines.

Referring to the drawings, there is illustrated a rigid frame 10 having a base 11, vertical side members 12, crosshead members 13 and outer gusset supports 14. An upper knife 15 is supported at its outer ends 16 in frame 10. Rigidly attached to ends 16 of upper knife 15 are downwardly extending guide members 17 having wear strips 17a affixed thereto, members 17 being vertically slidably enclosed between fixed frame guide members 18.

The outer ends 16 of upper knife 15 rest upon coil springs 19 which bias upper knife 15 upwardly to a position removed from the path of strip travel designated by line 20. Coil springs 19 rest upon the base 11 in restricting counter bores 21. The upper ends of the springs 19 are saddled in restricting counter bores 22 in ends 16 of upper knife 15. Upper knife 15 carries a blade 23 affixed at its bottom. A pair of toggle links 24 are pivotally suspended from the upper portion of the frame 10 on shafts 25 which are fixedly mounted in the frame 10 in bosses 26. Each toggle linkage has an upper link 27 and a matched set of lower links 28. Links 27 have extension hubs 29 integrally affixed thereto at one end opposite the junction with lower links 28 and are mounted on shafts 25 in bearings 25a through flange bushings 30. Links 27 are pivotally joined at their lower ends to links 28 by means of shafts 31 and bearings 31a and bushings 32. Bearings 31a are fixedly mounted in links 28. Links 28 are in turn pivotally attached at the end opposite their junction with upper links 27 to upper knife 15 by means of shafts 33 mounted in bearings 33a which are fixedly mounted in links 28 and turn in bushings 34 in the body of upper knife 15.

A single, laterally-reciprocable rod 35 is pivotally connected to linkages 24, preferably to upper links 27. The rod 35 fits through guide openings 36 in links 27 and is pivotally mounted on shafts 37 in bearings 37a which are fixedly secured across the openings 36 in links 27 and having appropriate bushings 38. Movement of rod 35 is caused by the actuation of a pneumatic cylinder 39 which is preferably mounted to the outside of frame 10. Rod 35 is pivotally attached at one end 70 to an enlarged end 41 of cylinder rod 42.

A lower knife 43, having a raked blade 44 appropriately secured to its upper portion, is mounted in frame 10 below the path of strip travel designated by arrow 20. The end portions 45 of lower knife 43 have vertical cylindrical bores 46 providing pathways for coil springs 19. The ends 45 have wear strips 47 attached to their outer edges which move in a fixed vertical path defined by the inner sides of the upper knife guide members 17. By defining the travel of the lower shear knife 43 within the inner sides of the upper knife guide 17 we are able to provide tighter alignment of the shear knives. Lower knife 43 is supported and governed in its movement preferably by a crank shaft assembly 48. The crank shaft 48 is journaled in base 11 of frame 10 with bushings 50. Crank shaft 48 has throw or eccentric portions 51 upon which are journaled connecting rods 52 on bushings 53. The connecting rods have generally cylindrical rocker heads 54 which are journaled in the bottom portion of lower knife 43 and are maintained therein by bearing caps 55. Crank shaft 48 is driven by any conventional power means (not shown).

Figure 2:
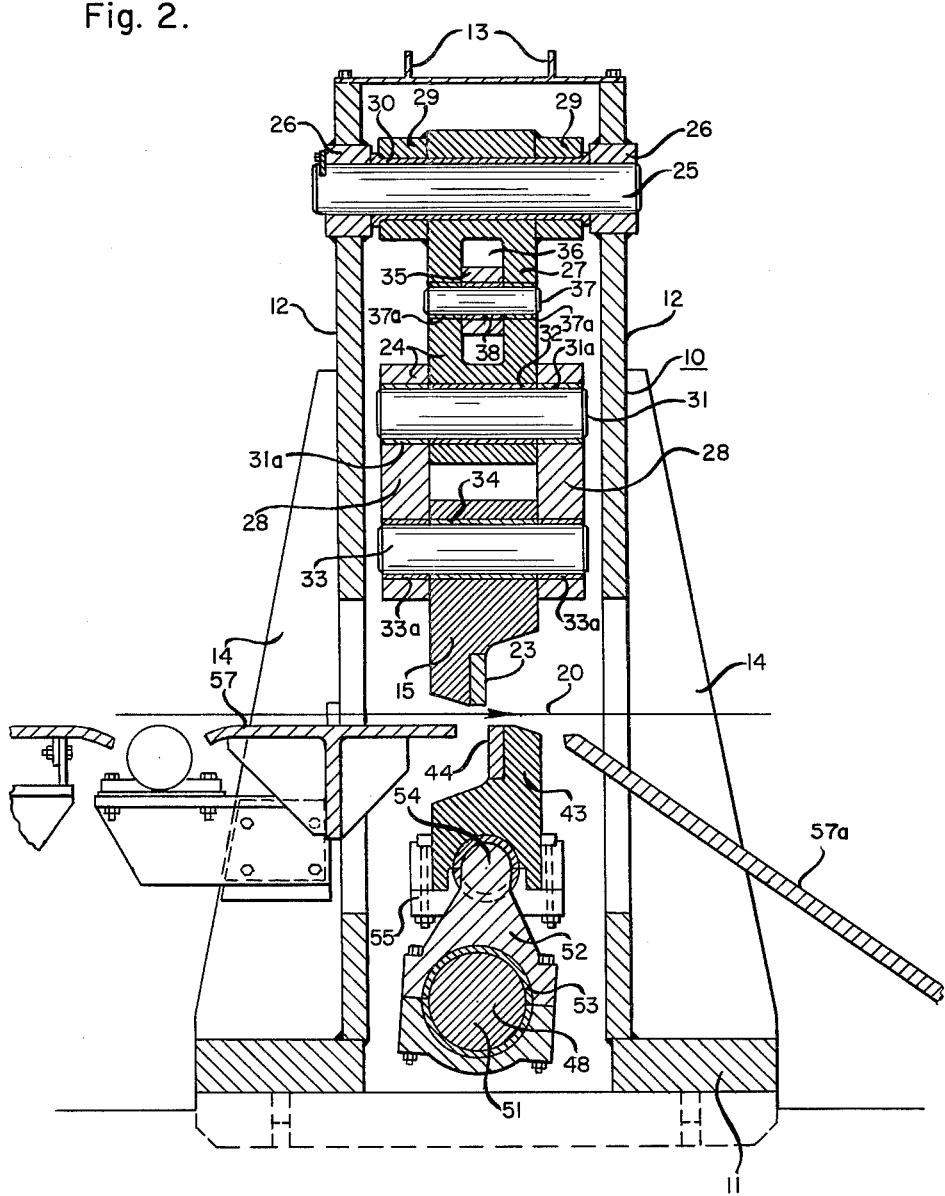
FIGURE 2 is a sectional view taken along line II—II of FIGURE 1.
Figure 3:
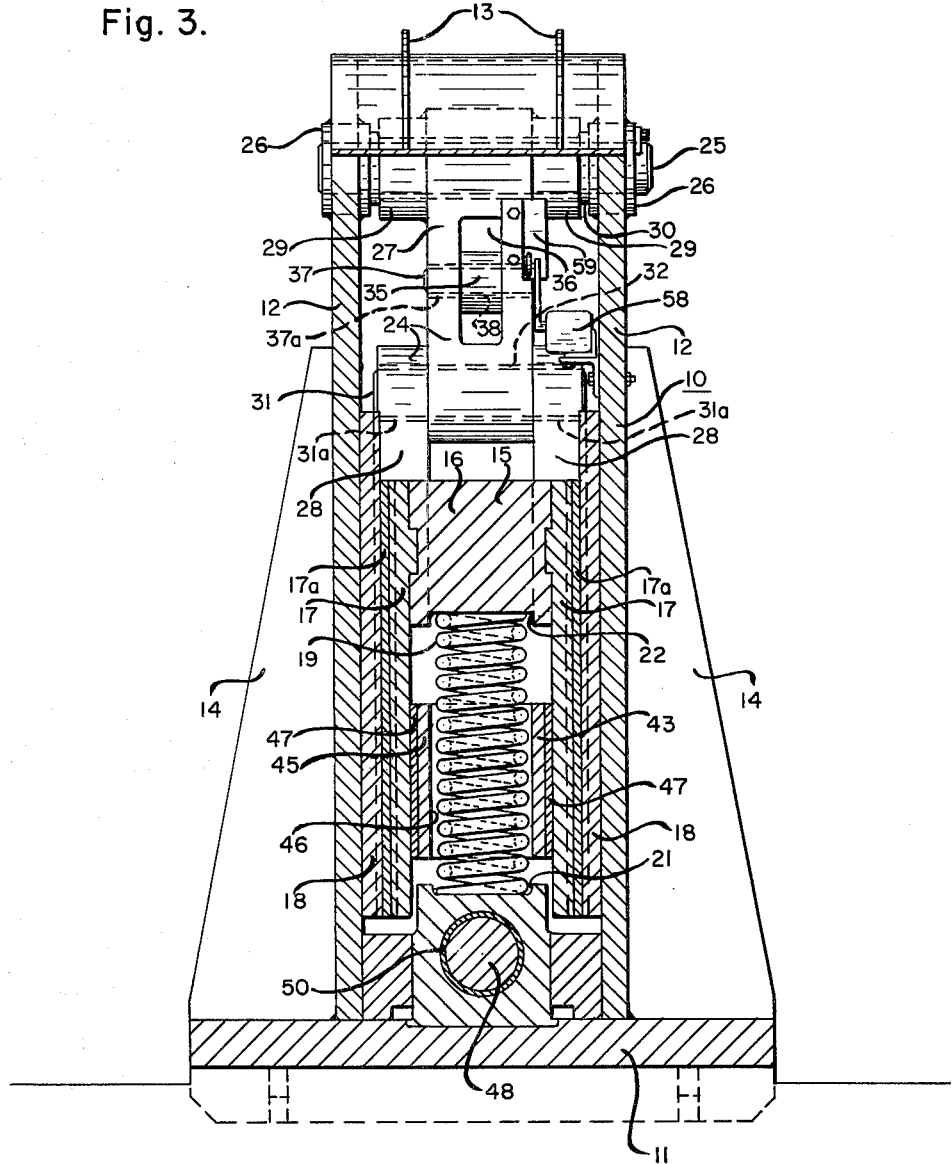
FIGURE 3 is a sectional view taken along lines III—III of FIGURE 1.

Means for feeding material to the shears are provided at the entry end of the shears as partially shown in FIGURE 2. Adjacent the shears and extending inside the frame 10, there is provided a feeding ledge 57 and at the exit side of the shears there is provided a ramp 57a to guide the removal of the cropped-off ends.

In operation, strip material travels at high speed along its path through the shearing apparatus of this invention. FIGURE 1 shows, in dotted lines, upper knife 15 in its retracted, inoperative position which it occupies while the strip is so moving and at all times except during the shearing operation. When a strip end which is to be cropped approaches the shears, the strip by manual or automatic control is slowed and fed onto feeding ledge 57 to a position in the shears wherein the desired line of cut on the strip is vertically aligned with the blades 23 and 44 of the respective knives 15 and 43. When the strip is appropriately positioned, pneumatic cylinder 39 is actuated to cause piston rod 42 to extend thus causing rod 35 to move laterally to its predetermined position shown in FIGURE 1 in solid lines. The movement of rod 35 causes links 27 of linkages 24 which are pivotally joined to rod 35 to rotate on their upper bearings 30 a predetermined distance to form vertical straight line braces with their respective lower links 28.

This movement of linkages 24 from the dotted line position to the solid line position of FIGURE 1 and the horizontal restraint of frame guide members 18 cause upper knife 15 to move downwardly in the frame to a predetermined position proximate to the upper surface of the strip material lying in its path of travel.

The air pressure in cylinder 39 is thereafter maintained so to hold rod 35 extended and thus maintain the linage of each link 24 in vertical straight-line posture. Upper knife 15 is thereby locked in position for the shearing operation.

Upon the linkages reaching their straight positions, a limit switch 58 is tripped by a member 59 which is carried on one of the links 27. The tripping of limit switch 58 energizes the power means (not shown) which drives lower knife 43. The energization of the power means causes crank shaft 48 to rotate. Eccentric portions 51 of crank shaft 48, by their rotation, throw connecting rods 52 upwardly. Connecting rods 52, having their rocker heads 54 based in lower knife 43, in turn, throw lower knife 43 upwardly and thus blade 44 of lower knife 43 across the path of strip travel and up to blade 23 of knife 15 thus severing the strip. In each shearing operation, since it is necessary only to throw the lower knife one time, a limit switch actuated by an appropriate revolution counting means attached to crank shaft 48 deenergizes the lower knife power means after crank shaft 48 has made one revolution thus causing lower knife 43 to return to its inoperative position beneath the path of material travel after having made one pass at the strip material.

Upon the deenergiaztion of the power means, the valve of pneumatic cylinder 39 is opened thereby causing piston rod 42 to begin retracting and thus move the linkages 24 out of their vertical, locked positions. Upon the release of linkages 24 from their vertically locked position, coil springs 19, which throughout the shearing operation have been depressed by the outer ends 16 of the upper knife 15, are thereby released and cause upper knife 15 to rise to its inoperative position where it is maintained until the next shearing operation.

While we have illustrated and described a present prefererd embodiment of the invention, it is to be understood that the invention is not limited thereto, but may be otherwise embodied within the scope of the following claims.

We claim:

1. Shearing apparatus comprising means for feeding a material to be sheared along a path, a rigid frame surrounding the path of material travel, an upper knife supported in the frame transversely above the path of material travel, the upper knife being extendible into an operative position proximate to the path of material travel and retractable therefrom into an inoperative position remote from the path of material travel, a plurality of toggle links connecting the upper knife and frame, said links being operable between a flexed position in which the upper knife is in the retracted position to a straight position in which the knife is in the extended position, fluid cylinder means mounted on the frame, piston means in the cylinder operatively connected to the plurality of toggle links to move them selectively between the flexed position and the straight position, biasing means on the frame urging the upper knife toward the inoperative position, a lower knife supported in the frame transversely beneath the path of material travel, the lower knife being movable across the path of material travel, and means operable to move the lower knife across the path of material travel when the upper knife is moved to the extended position.

2. Shearing apparatus comprising means for feeding the material to be sheared along a path, a rigid frame surrounding the path of material travel, a lower knife supported in the frame transversely beneath the path of material travel, the lower knife being movable across the path of material travel, means responsive to a signal operable to move the lower knife across the path of material travel, an upper knife supported in the frame transversely above the path of material travel, the upper knife being movable between a retracted inoperative position remote from the path of material travel and an extended operative position proximate to the path of material travel, a plurality of toggle linkages intermediate the upper knife and the frame operable between a flexed position in which the upper knife is in the retracted position and a straight position in which the upper knife is in the extended position, a pneumatic cylinder mounted on the frame operably connected to the toggle linkages to move them between the flexed position and the straight position, the cylinder being operable to maintain the linkages in the straight position during the shearing operation, the cylinder further being responsive to a signal to release the linkages from the straight position and a plurality of coil springs supporting the upper knife in the frame operable to move the upper knife from the extended position to the retracted position and to maintain the upper knife in the retracted position.

3. Shearing apparatus comprising means for feeding the material to be sheared along a path, a rigid frame surrounding the path of material travel, a lower knife supported in the frame transversely beneath the path of material travel, the lower knife being movable across the path of material travel, means responsive to a signal operable to move the lower knife across the path of material travel, an upper knife supported in the frame transversely above the path of material travel, the upper knife being extendible into an operative position proximate to the path of material travel and retractable therefrom into an inoperative position remote from the path of material travel, means intermediate the upper knife and the frame operable to move the upper knife from the retracted position to the extended position, said means being operable to maintain the upper knife in the extended position during the shearing operation, said means further being responsive to a signal to release the upper knife from the extended position, and spring means supporting the upper knife in the frame operable to move the upper knife from the extended position to the retracted position, the spring means further being operable to maintain the upper knife in the retracted position during inoperativeness.

4. Shearing apparatus comprising means for feeding the material to be sheared along a path, a rigid frame surrounding the path of material travel, a lower knife supported in the frame transversely beneath the path of material travel, the lower knife being movable across the path of material travel, means responsive to a signal operable to move the lower knife across the path of material travel, an upper knife supported in the frame transversely above the path of material travel, the upper knife being extendible into an operative position proximate to the path of material travel and retractable therefrom into an inoperative position remote from the path of material travel, a plurality of toggle linkages intermediate the upper knife and the frame operable between a flexed position in which the upper knife is in the retracted position and a straight position in which the upper knife is in the extended position, means mounted on the frame operably connected to the toggle linkages to move them between the flexed position and the straight position, said means being operable to maintain the linkages in the straight position during the shearing operation, said means further being responsive to a signal to release the linkages from the straight position after the shearing operation, and means supporting the upper knife in the frame operable to move the upper knife from the extended position to the retracted position, said means further being operable to maintain the upper knife in the retracted position during inoperativeness.

5. A shearing apparatus comprising means for feeding a material to be sheared along a path, a rigid frame surrounding the path of material travel, an upper knife supported in the frame transversely above the path of material travel, the upper knife being extendible into an operative position proximate to the path of material travel and retractable therefrom into an inoperative position remote from the path of material travel, means on the frame operable selectively to move the upper knife from the retracted position to the extended position, said means being operable to maintain the upper knife in the extended position during the shearing operation and to return it to the inoperative position other than during the shearing operation, a lower knife supported in the frame transversely beneath the path of material travel, the lower knife being movable across the path of material travel, and means operable to move the lower knife across the path of material travel when the upper knife is moved to the extended position said the upper knife being provided with depending guides carrying the lower knife.

6. A shearing apparatus comprising means for feeding a material to be sheared along a path, a rigid frame surrounding the path of material travel, an upper knife supported in the frame transversely above the path of material travel, the upper knife being extendible into an operative position proximate to the path of material travel and retractable therefrom into an inoperative position remote from the path of material travel, means on the frame operable selectively to move the upper knife from the retracted position to the extended position, said means being operable to maintain the upper knife in the extended position during the shearing operation and to return it to the inoperative position other than during the shearing operation, a lower knife supported in the frame transversely beneath the path of material travel, the lower knife being movable across the path of material travel, and means operable to move the lower knife across the path of material travel when the upper knife is moved to the extended position; said the lower knife travel being defined by a portion of the upper knife.

References Cited by the Examiner

UNITED STATES PATENTS

| 1,153,287 | 9/1915 | Candee | 83—563 |
| 2,757,731 | 8/1956 | Musly | 83—623 |
| 2,825,405 | 3/1958 | Maass | 83—623 |
| 3,066,566 | 12/1962 | Bottenhorn | 83—623 |
| 3,137,191 | 6/1964 | O'Brien | 83—623 |

WILLIAM W. DYER, Jr., *Primary Examiner.*

ANDREW R. JUHASZ, *Examiner.*

J. L. SEITCHIK, W. S. LAWSON,
*Assistant Examiners.*